(12) United States Patent
Rosenberg et al.

(10) Patent No.: US 8,611,893 B2
(45) Date of Patent: Dec. 17, 2013

(54) SYSTEM AND METHOD FOR ROAMING BETWEEN NETWORKS

(75) Inventors: Jonathan D. Rosenberg, Freehold, NJ (US); James C. Beall, Lafayette, CO (US)

(73) Assignee: Cisco Technology, Inc., San Jose, CA (US)

( * ) Notice: Subject to any disclaimer, the term of this patent is extended or adjusted under 35 U.S.C. 154(b) by 1324 days.

(21) Appl. No.: 11/175,774

(22) Filed: Jul. 5, 2005

(65) Prior Publication Data

US 2006/0019659 A1    Jan. 26, 2006

Related U.S. Application Data

(60) Provisional application No. 60/585,546, filed on Jul. 2, 2004.

(51) Int. Cl.
*H04W 4/00*     (2009.01)

(52) U.S. Cl.
USPC ............ 455/432.1; 455/432.2; 455/436; 370/331; 370/467

(58) Field of Classification Search
USPC ........ 455/432.1–432.3, 436–444, 422.1, 433; 370/522, 310, 328, 331, 338, 352–356, 370/464–467

See application file for complete search history.

(56) References Cited

U.S. PATENT DOCUMENTS

| | | | |
|---|---|---|---|
| 5,307,400 A | 4/1994 | Sawyer et al. | 379/59 |
| 5,481,673 A | 1/1996 | Michelson | 395/200.15 |
| 6,775,368 B1 | 8/2004 | Lee et al. | 379/211.02 |
| 2001/0031635 A1* | 10/2001 | Bharatia | 455/432 |
| 2003/0097413 A1 | 5/2003 | Vishik et al. | 709/206 |
| 2003/0137962 A1* | 7/2003 | Tsirtsis et al. | 370/338 |
| 2004/0028208 A1 | 2/2004 | Carnazza et al. | 379/221.01 |
| 2004/0116120 A1* | 6/2004 | Gallagher et al. | 455/436 |
| 2004/0266426 A1* | 12/2004 | Marsh et al. | 455/426.2 |
| 2005/0083904 A1 | 4/2005 | Khartabil et al. | 370/351 |
| 2005/0130650 A1* | 6/2005 | Creamer et al. | 455/432.1 |
| 2005/0243870 A1* | 11/2005 | Balogh et al. | 370/522 |

* cited by examiner

*Primary Examiner* — Ajit Patel
(74) *Attorney, Agent, or Firm* — Baker Botts L.L.P.

(57) ABSTRACT

A system and method for roaming between networks include determining a presence of a mobile unit by determining when the mobile unit leaves a first network and enters a second network, and routing one or more calls based on the presence of the mobile unit by offloading the one or more calls to the second network into which the mobile unit roams.

31 Claims, 5 Drawing Sheets

SYSTEM AND METHOD FOR ROAMING BETWEEN NETWORKS

RELATED APPLICATION

This Application claims the benefit under 35 U.S.C. §119 (e) of U.S. Provisional Application Ser. No. 60/585,546 entitled: "Voice over WiFi as an STP Offload Application," filed on Jul. 2, 2004 and incorporated by reference herein.

TECHNICAL FIELD OF THE INVENTION

This invention relates generally to the field of communications and more specifically to a system and method for roaming between networks.

BACKGROUND

As the cellular industry continues to expand, Voice over Wi-Fi (VoWiFi) is gaining attention as an important application. In this application, a cellular user has a dual mode handset that supports traditional cellular service and Wi-Fi access. When the cellular user roams into an area that has Wi-Fi coverage, the user may receive and make phone calls using Wi-Fi as the access, rather than traditional cellular. To transition between the cellular network and the Wi-Fi network, a handoff occurs between the networks. A handoff may present problems for the user, such as a call being disconnected, and problems for the industry, such as using expensive techniques to hand off a call between networks.

SUMMARY OF THE DISCLOSURE

From the foregoing, it may be appreciated by those skilled in the art that a need has arisen for an improved system and method for roaming between networks. In accordance with the present invention, disadvantages and problems associated with conventional roaming and handoff techniques may be reduced or eliminated.

According to one embodiment of the present invention, a system and method for roaming between networks include determining a presence of a mobile unit by determining when the mobile unit leaves a first network and enters a second network, and routing one or more calls based on the presence of the mobile unit by offloading the one or more calls to the second network into which the mobile unit roams.

Certain embodiments of the invention may provide one or more technical advantages. A technical advantage of one embodiment includes supporting a seamless handoff between the networks to allow a user to be on a call using a circuit-based network, roam into packet-based coverage, and continue with the call on the packet-based network. Another technical advantage of another embodiment includes using packet-based networks at home, work, while traveling, or in any other environment to reduce the cost of voice services. The technique may be deployed at a low cost and it puts equipment in place that may be useful for other applications launching on the packet-based network. Another technical advantage of another embodiment includes allowing users to access services in places where no circuit-based coverage is available, but packet-based coverage is available. For example, while internationally roaming, a cellular user may take advantage of existing packet-based networks to use their mobile unit internationally. Typically, Code Division Multiple Access (CDMA) units in the United States are not capable of international roaming, either into GSM networks or other CDMA networks. The ubiquity of packet-based networks allows a user to get service anywhere in the world that has the packet-based network.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, wherein like reference numerals represent like parts, in which.

DETAILED DESCRIPTION OF THE DRAWINGS

Figure 1:
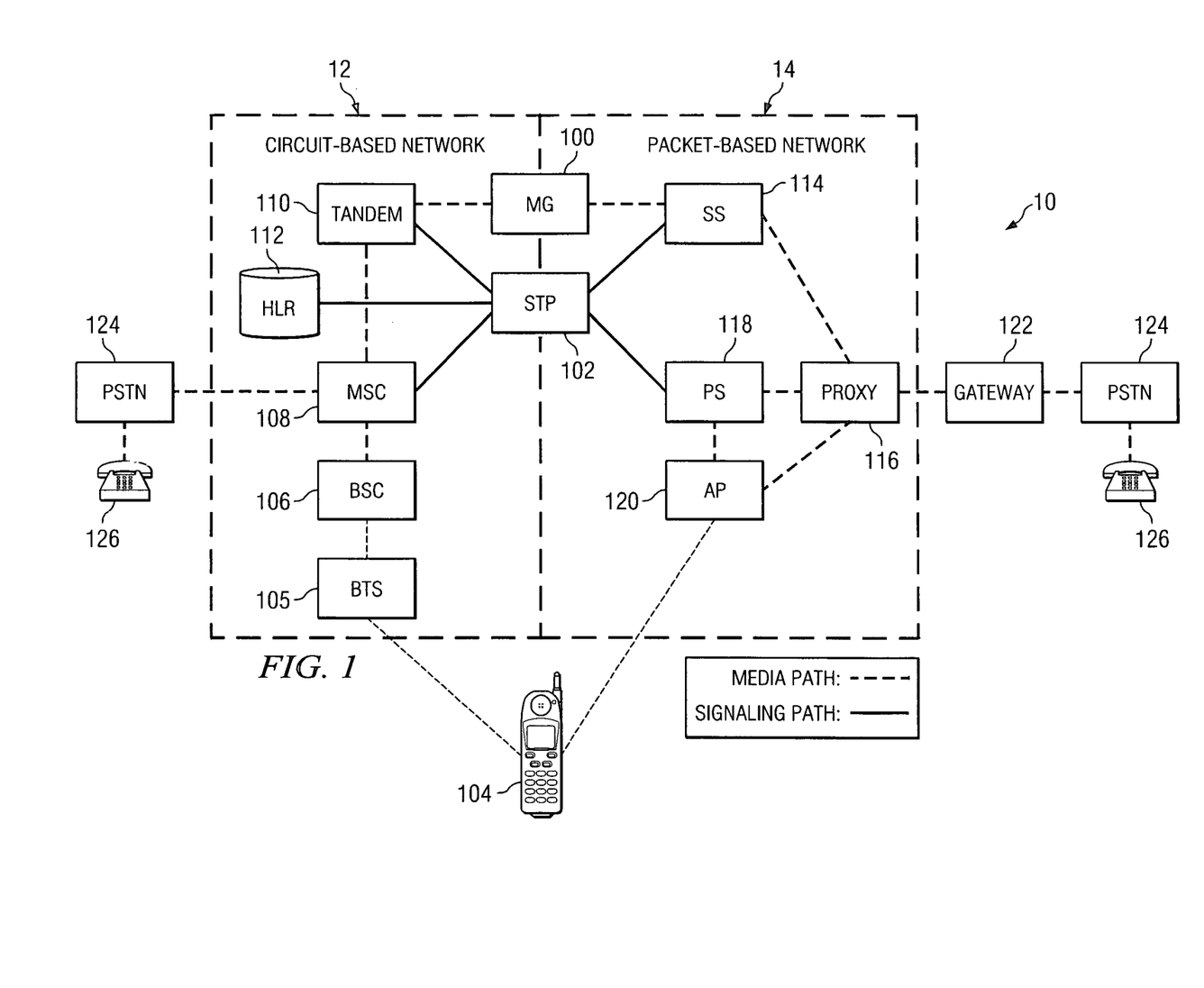
FIG. 1 is a block diagram illustrating a Single Transfer Point (STP) offload architecture.

FIG. 1 is a block diagram illustrating a Signal Transfer Point (STP) offload architecture. The architecture includes a system 10 that provides for roaming between a circuit-based network 12 and a packet-based network 14. System 10 includes a media gateway (MG) 100 and a STP 102 that facilitate the roaming of a mobile unit 104 between circuit-based network 12 and packet-based network 14.

Mobile unit 104 may be a cell phone, a data phone, a portable data device, a portable computer, a handheld device, a handset, or other suitable device capable of communicating information between and within circuit-based network 12 and packet-based network 14. In an embodiment, mobile unit 104 is a dual-mode handset that is compatible with both networks. Mobile unit 104 may have a packet-based network 12 interface that connects mobile unit 104 to access point 120, which gives mobile unit 104 packet-based connectivity.

Circuit-based network 12 may be any suitable network that provides service for mobile unit 104 using circuit-based properties, such as a cellular network. Cellular networks may be based on any suitable technology, such as CDMA, GSM, or time division multiple access (TDMA). Circuit-based network 12 includes elements, such as base station controller (BSC) 106, mobile switching center 108, tandem switch 110, and home location register (HLR) 112 that facilitate mobile unit 104 communicating within circuit-based network 12. Communications between the elements in circuit-based network 12 are based on any suitable protocol, such as Signaling System No. 7. Mobility management within circuit-based network 12 may be handled using any suitable technique, such as conventional cellular techniques.

BSC 106 works with a base transceiver station (BTS) 105 to act as a link between mobile units 104 and a wireline telephone network such as PSTN 124. BSC 106 connects to MSC 108. BSC 106 and MSC 108 provide switch and soft handoff functionality for circuit-based network 12. In this way, information, such as voice, video, audio, text, and/or any other type of information, is routed to and from mobile units 104 and connections are maintained with mobile units 104 as they move throughout a wireless network. MSC 108 is also able to perform authentication and set up and disconnect calls for mobile units 104 serviced by BTS 105. MSC 108 may serve as the point-of-access to a Public Switched Telephone Network (PSTN) 124. MSC 108 connects to any suitable tandem switch 110.

Tandem switch 110 connects trunks to one another. In the illustrated embodiment, tandem switch 110 connects a trunk between itself and MG 100 and a trunk between itself and MSC 108. Tandem switch 110 is an intermediate switch or connection between an originating call location and the final destination of the call.

HLR 112 stores permanent subscriber information for circuit-based network 12. Maintained by the home carrier of mobile unit 104 or the operator where mobile unit 104 initiated the call, HLR 112 contains pertinent information about mobile unit 104, including address, account status, and preferences.

MG 100 and STP 102 interact with circuit-based network 12 and packet-based network 14 to provide for roaming services between networks. MG 100 provides for a conversion between audio signals carried on circuit-based network 12 and data packets carried over packet-based network 14. STP 102 sets up and tears down calls of mobile unit 104 in circuit-based network 12. In addition to routing capabilities in circuit-based network 12, STP 102 is capable of acting as a signaling gateway into packet-based network 14. STP provides a signaling path as illustrated by the double lines in FIG. 1. In particular embodiments, STP 102 is the point of intelligence in routing calls to mobile unit 104 when mobile unit 104 roams into packet-based network 14.

Packet-based network 14 may include any suitable network that provides for communication through packets, such as a wireless fidelity (Wi-Fi) network or broadband. Wi-Fi access may support any suitable technology, such as 802.11a, 802.11b, 802.11g, or WiMax. In particular embodiments, packet-based network 14 includes a soft switch (SS) 114, a proxy 116, a presence server (PS) 118, and an access point (AP) 120. Mobility management within packet-based network 14 is handled using handoff techniques between points-of-access using any suitable technique, such as conventional Wi-Fi techniques.

Ss 114 controls MG 100 using any suitable technology, such as Media Gateway Control Protocol. Ss 114 may include any suitable combination or arrangement of logic.

Proxy 116 relays information between clients and may make protocol conversions in the process. For example, proxy 116 may convert from one protocol to another when relaying information to/from gateway 122 to elements within packet-based network 14. Proxy 116 communicates with SS 114, PS 118, AP 120, and gateway 122 using any suitable technology.

A gateway 122 may connect to proxy 116 of packet-based network to allow communication between packet-based network 14 and a non-packet-based network, such as PSTN 124. Gateway 122 may handle signaling, which notifies mobile unit 104 and endpoint 126 of a communication session, or signaling and media, which has notification capabilities and exchanges information, such as audio, video, or data, between mobile unit 104 and endpoint 126.

PS 118 processes information to determine the presence information of mobile unit 104 and acts as a registrar, allowing mobile units 104 to register their respective addresses. PS 118 keeps track of the presence of mobile unit 104, such as whether mobile unit 104 is communicating in circuit-based network 12 or packet-based network 12. Presence information may include any suitable information that describes the location of the relevant user, the availability of that user, the reachability of the user, and/or preferred modes of communication for the user for the purposes of communicating with other users. Examples of presence information include, but are not limited to, information indicating whether a user is currently logged into a particular network or component, information identifying a wireless network in which the user is currently located, information indicating whether the user has used a particular component of network 10 within a predetermined time period, information identifying an activity presently scheduled for the user, and information specifying a physical location of the user. PS 118 may operate using any suitable protocol.

Within packet-based network 14, STP 102 acts as a presence client and subscribes to the presence of mobile unit 104 for which it provides service. In this way, STP 102 learns the availability of users on packet-based network 14 and circuit-based network 12, making it a presence-enabled call routing application.

In operation, mobile unit 104 establishes a call while located in circuit-based network 12 or packet-based network 14. As mobile unit 104 roams between networks, STP 102 routes calls to mobile unit 104 based on presence information of mobile unit 104.

Modifications, additions, or omissions may be made to system 10 without departing from the scope of the invention. For example, STP 104 may offload calls to mobile unit 104 that enters packet-based network 14 even if mobile unit 104 is roaming on circuit-based network 12. Moreover, the operations of system 10 may be performed by more, fewer, or other modules. Additionally, operations of system 10 may be performed using any suitable logic comprising software, hardware, other logic, or any suitable combination of the preceding. The logic may be embodied on a computer readable medium.

Figure 2:
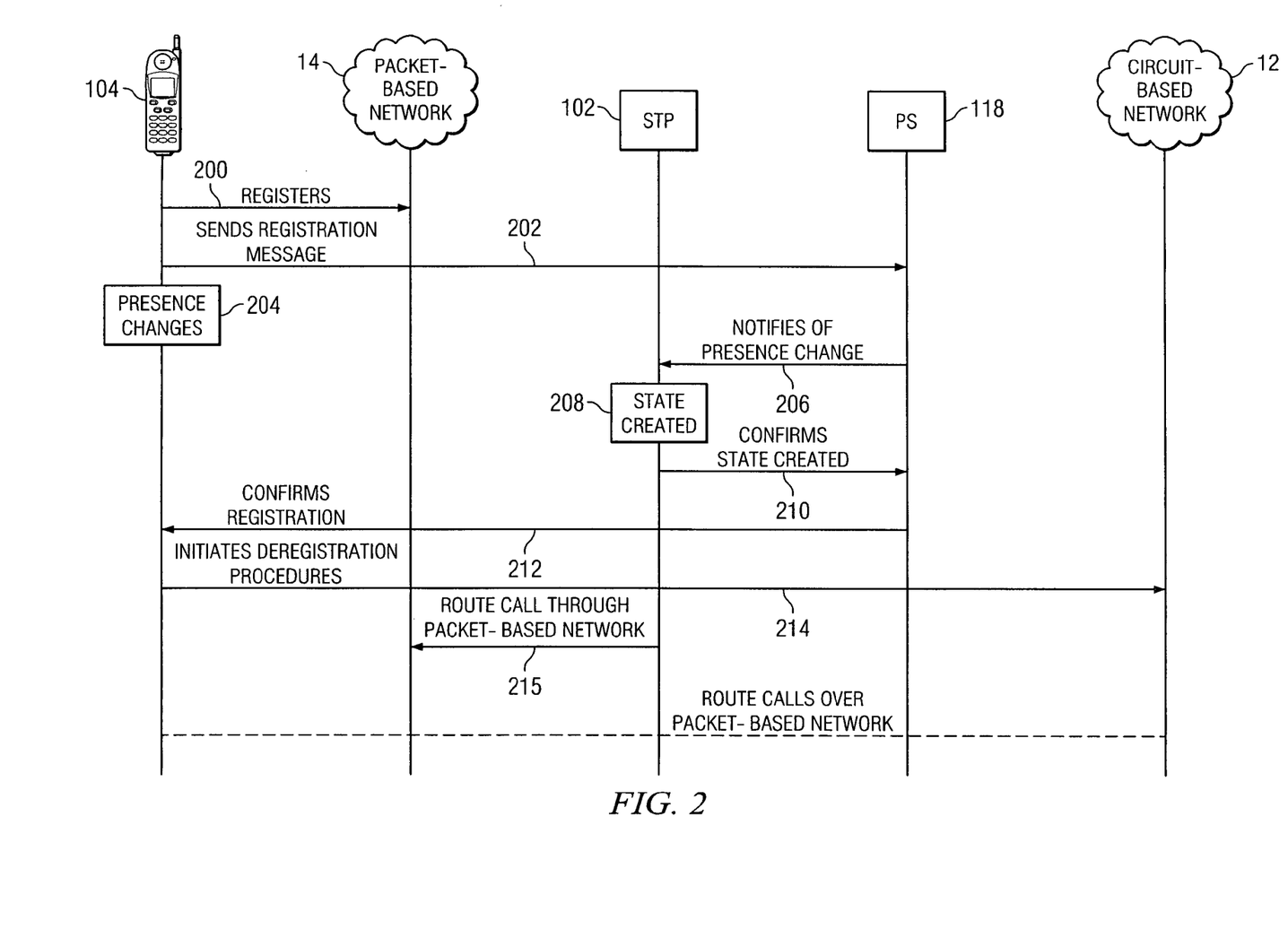
FIG. 2 is a call-flow diagram illustrating a mobile unit roaming from a circuit-based network to a packet-based network using the STP offload architecture.
Figure 3:
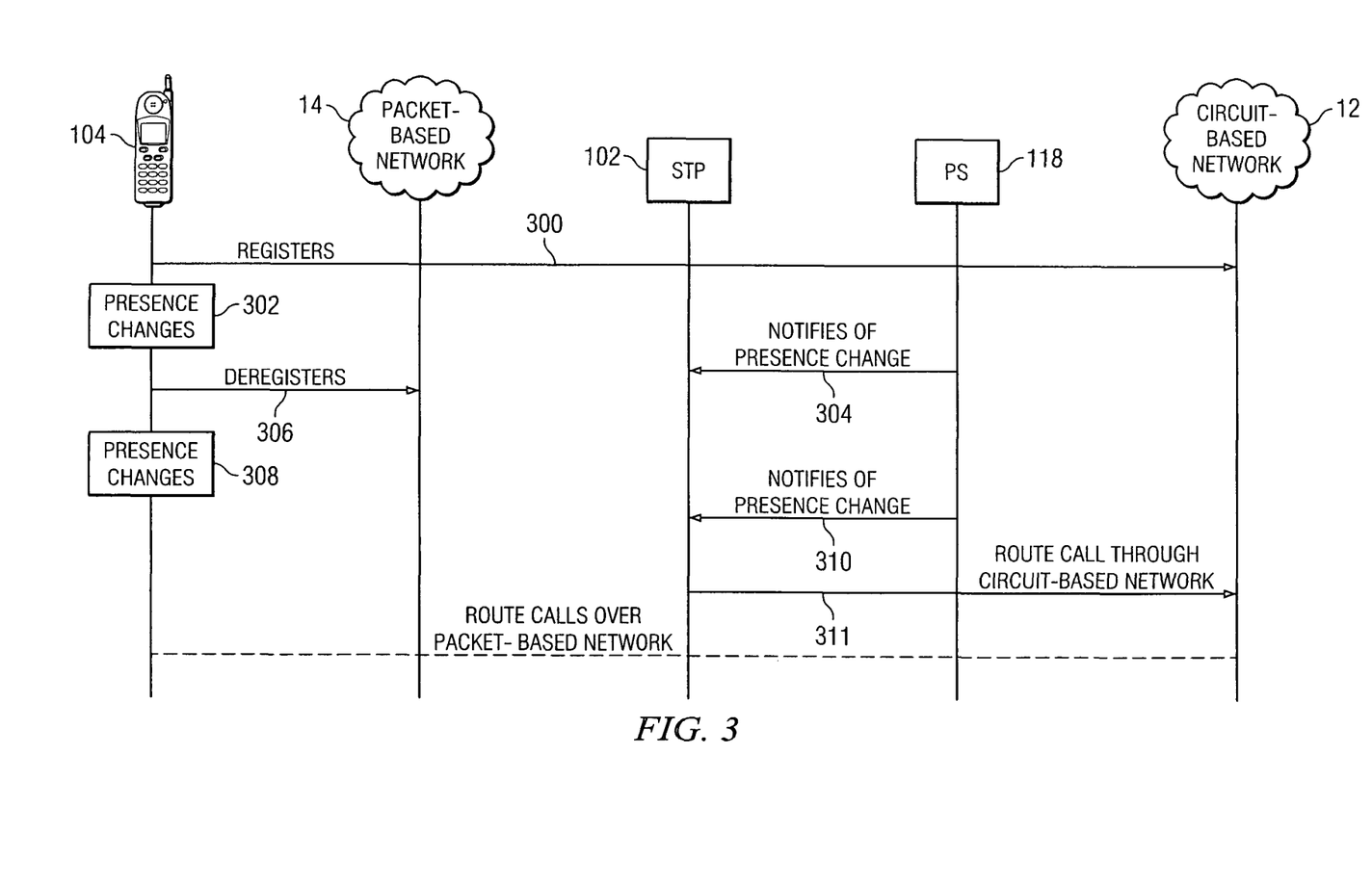
FIG. 3 is a call-flow diagram illustrating the mobile unit roaming from the packet-based network to the circuit-based network using the STP offload architecture.

FIGS. 2 and 3 illustrate call-flow diagrams between circuit-based network 12 and packet-based network 14. Particularly, the case of roaming from circuit-based network 12 to packet-based network 14 and the case of roaming from packet-based network 14 to circuit-based network 12 are provided as examples.

FIG. 2 is a call-flow diagram illustrating mobile unit 104 roaming from circuit-based network 12 to packet-based network 14 using the STP offload architecture. In the illustrated call-flow diagram, mobile unit 104 roams into an area where overlapping circuit-based coverage and packet-based coverage is available. Mobile unit 104 detects the availability of the packet-based coverage in the overlapping coverage region. At message 200, mobile unit 104 registers on packet-based network 14 to receive incoming calls and obtains an Internet Protocol (IP) address. Mobile unit 104 may use normal 802.11 procedures to register. To initiate registration, a user using mobile unit 104 may be prompted to register on packet-based network 14. Alternatively, mobile unit 104 may automatically register on packet-based network 14 upon detecting the coverage.

Upon obtaining packet-based connectivity, mobile unit 104 sends a registration message to its configured registrar at message 202. In the illustrated embodiment, PS 118 serves as the registrar for mobile unit 104. The registration message may be a Session Initiation Protocol (SIP) REGISTER message that informs PS 118 that mobile unit 104 is available on packet-based network 14. The registration message includes an address-of-record (AOR) that contains the phone number of mobile unit 104. Upon registration, the presence of mobile unit 104 changes at event 204. PS 118 sends notification to STP 102 at message 204 that the presence of mobile unit 104 has changed and mobile unit 104 is available on packet-based network 14. A state associated with mobile unit 104 is created within STP 102 that is used to determine how to route later incoming calls at event 208. The state includes the presence of mobile unit 104.

STP 102 confirms the creation of the state with PS 118 at message 210. PS 118 confirms the registration with mobile unit 104 at message 212. Switching over to packet-based network 14 from circuit-based network 12 in an overlapping region may be triggered based on a signal strength associated with mobile unit 104 or any other desired criteria. Mobile unit 104 initiates deregistration procedures from circuit-based network 12 at switch overusing conventional procedures at message 214. In an embodiment, STP 102, BSC 106, and MSC 108 may retain the connection information associated with circuit-based network 12 to facilitate re-connection within circuit-based network 12 in case mobile unit 104 roams back into circuit-based network 12. At this point, incoming calls for mobile unit 104 may be routed over packet-based network 14 at message 215.

FIG. 3 is a call-flow diagram illustrating mobile unit 104 roaming from packet-based network 14 to circuit-based network 12 using the STP offload architecture. In this example, mobile unit 104 roams out of packet-based coverage and into an area providing circuit-based coverage. Mobile unit 104 detects the change in coverage by noticing the loss of packet-based coverage or by noticing the availability of overlapping circuit-based coverage. Mobile unit 104 registers on circuit-based network 12 to receive incoming calls at message 300 using conventional registration procedures. Because mobile unit 104 registers with circuit-based network 12, the presence of mobile unit 104 changes at event 302. PS 118 recognizes the change of presence because it has connectivity into circuit-based network 12. Because the presence of mobile unit 104 changes, PS 118 notifies STP 102 at message 304, informing it that mobile unit 104 now has availability for circuit-based service.

At message 306, mobile unit 104 deregisters from packet-based network 14. Deregistration causes the presence of mobile unit 104 to change again at event 308. PS 118 notifies STP 102 of the presence change at message 310. Incoming calls are now routed over circuit-based network 12 at message 311. Switching over to circuit-based network 12 from packet-based network 14 in an overlapping region may be triggered based on signal strength associated with mobile unit 104 or any other desired criteria. STP 102 may retain the connection information associated with packet-based network 14 to facilitate re-connection within packet-based network 12 in case mobile unit 104 roams back into packet-based network 14.

Figure 4:
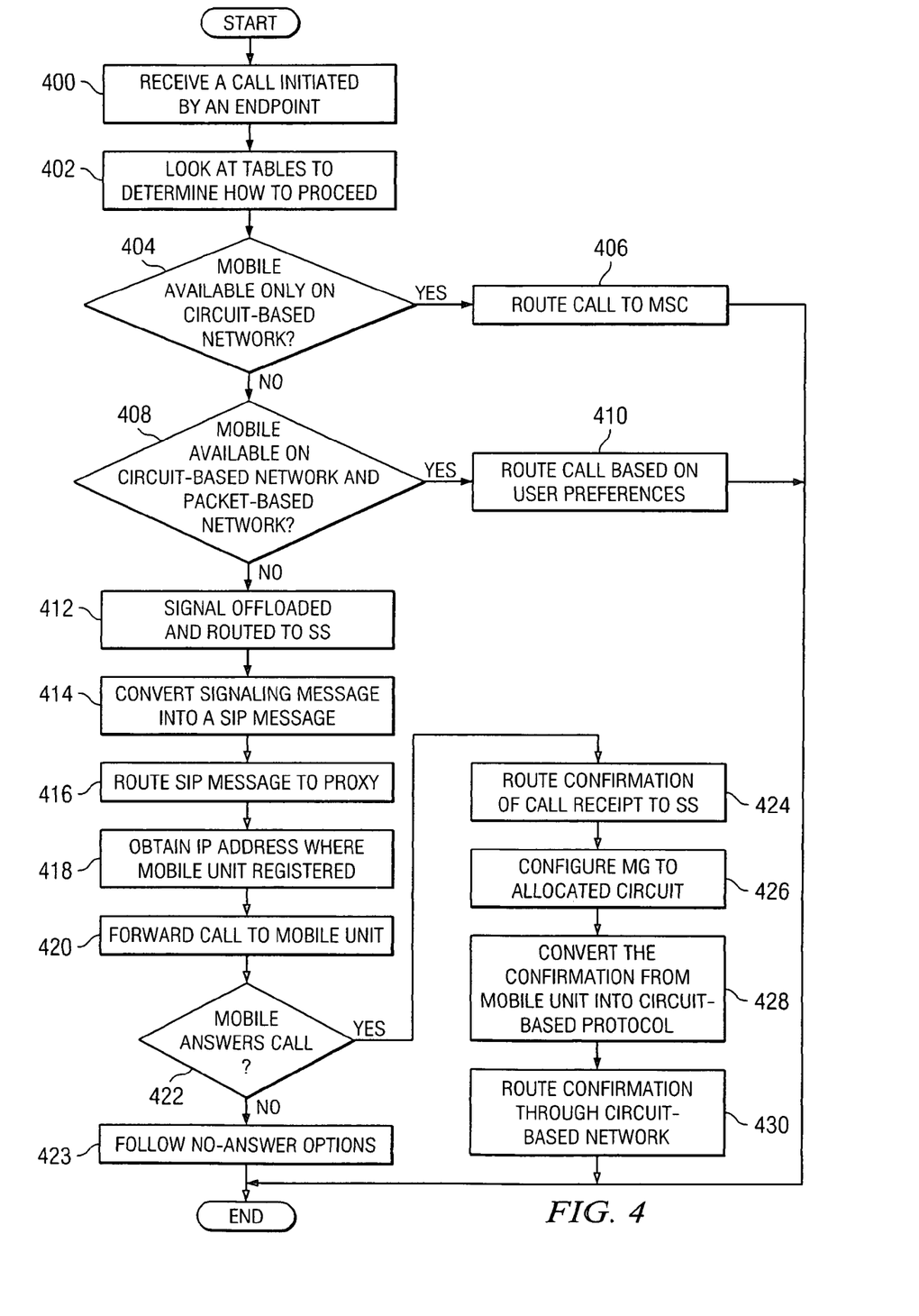
FIG. 4 is a flowchart illustrating an example method of the mobile unit receiving a call.
Figure 5:
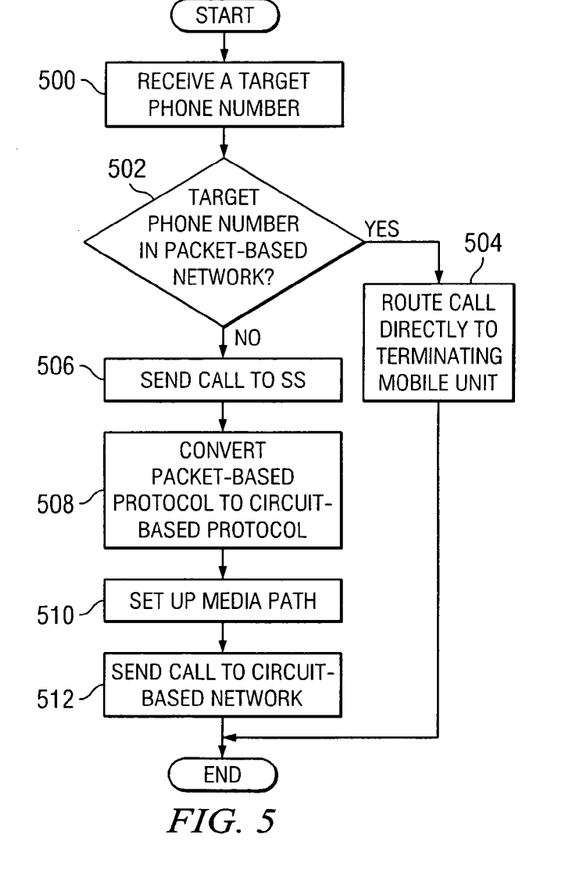
FIG. 5 is a flowchart illustrating an example method of the mobile unit originating a call.

FIGS. 4 and 5 illustrate mobile unit 104 handling a call.

Endpoint 126 on PSTN 124 makes a call to mobile unit 104. If mobile unit 104 is registered on circuit-based network 12, the call may be routed to the home MSC 108 through STP 102 that fronts MSC 108. In other cases, inter-BSC 106 and inter-MSC 108 calls will not be routed through STP 102. If the call is not routed through the home MSC 108 and mobile unit 104 is registered on circuit-based network 12, the call is sent to mobile unit 104 on circuit-based network 12. If mobile unit 104 is not registered on circuit-based network 12 but is on packet-based network 14, the signaling is routed through STP 102. As a result, MSC 108 is configured to send the signaling through STP 102, which may be done in any suitable manner.

FIG. 4 is a flowchart illustrating an example method of mobile unit 104 receiving a call. The call-flow begins when a call from endpoint 126 reaches STP 102 at step 400. STP 102 looks at the state associated with mobile unit 104 and determines how to proceed at step 402. At 404, it is determined whether mobile unit 104 is available only on circuit-based network 12. If mobile unit 104 is available only on circuit-based network 12, STP 102 passes the call to MSC 108. If mobile unit 104 is not available only on circuit-based network 12, the method continues by determining if mobile unit 104 is available on circuit-based network 12 and packet-based network 14 at step 408. If mobile unit 104 is available on both networks, the decision on how to route the call is based on user preferences at step 410. When the determination on how to route the call is based on user preferences, the call may be routed to SS 114. However, if mobile unit 104 is not available on both networks, then mobile unit 104 is available only on packet-based network 14. The signaling of the call is offloaded through a signaling gateway function and routed to SS 114 at step 412.

If the signaling is diverted to SS 114 through a co-located signaling gateway function, SS 114 converts the signaling message, which may be an Integrated Services Digital Network User Part (ISUP) Internal Address Message (IAM), into a SIP INVITE message at step 414. The SIP INVITE is routed to proxy 116 at step 416. At step 418, proxy 116 communicates with PS 118 and obtains the IP address where mobile unit 114 is registered. Proxy 116 then forwards the call to mobile unit 104 at step 420. If mobile unit 104 does not answer the call at step 422, the method subsequently proceeds to no answer options for termination of the call at step 423. If mobile unit 104 answers the call at step 422, mobile unit 104 routes confirmation of receipt of the call to SS 114 at step 424. SS 114 configures MG 100 to allocate a circuit at step 426. The circuit is connected to tandem switch 110 on which the call arrives and connected to mobile unit 104 on packet-based network 14 using Real Transport Protocol. SS 114 converts the confirmation received from mobile unit 104 into circuit-based protocol with the appropriate circuit indicated. For example, if the confirmation is a SIP 200OK, SS 114 converts the 200OK into an ISUP Answer Message (ANM). The confirmation is routed through the circuit-based network at step 430. From the process, the call is connected to SS 114 through the signaling gateway and MG 100, and the call is connected to mobile unit 100 through packet-based network 14. MSC 108 never sees the incoming call using this process. Therefore, the load of MSC 108 is decreased as users roam into packet-based network 14. Although particular steps of the method illustrated in FIG. 4 have been illustrated and described as occurring in a particular order, any suitable steps of the method illustrated in FIG. 4 may occur in any suitable order.

FIG. 5 is a flowchart illustrating an example method of mobile unit 104 originating a call. At step 500, proxy 116 receives a message from mobile unit 104 that desires to contact a user at a target phone number. The message contains the target phone number of the user. The message may be in any suitable packet-based protocol, such as a SIP INVITE message. At step 502, proxy 116 determines whether the target phone number is in packet-based network 14. If the target phone number is in packet-based network 14, the call is directly routed to the terminating user without going through circuit-based network 12. However, if the target phone number is not registered in packet-based network 14, proxy 116 sends the call to SS 114 at step 506. SS 114 converts the packet-based protocol into circuit-based protocol. For example, SS 114 converts the SIP INVITE into an ISUP IAM. At step 510, SS 114 communicates with MG 100 to set up the media path. The call is sent to circuit-based network 12 using conventional techniques at step 512. Mobile unit 104 may communicate with the user at the target phone number and terminate the call using conventional processes. Although particular steps of the method illustrated in FIG. 5 have been illustrated and described as occurring in a particular order, any steps of the method illustrated in FIG. 5 may occur in any suitable order.

Figure 6:
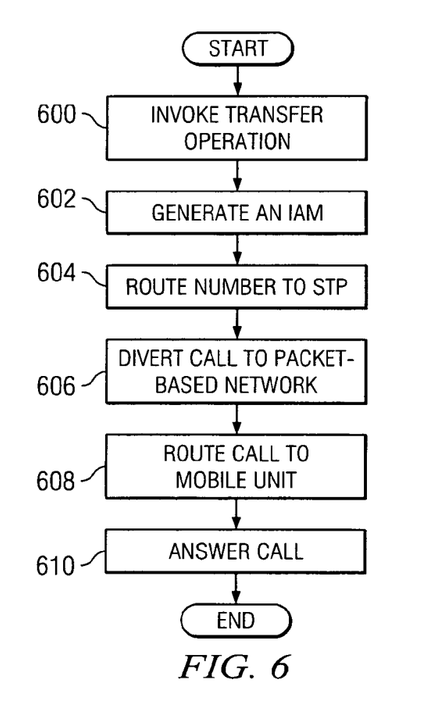
FIG. 6 is a flowchart illustrating a handoff of the mobile unit's call from the circuit-based network to the packet-based network.

FIG. 6 is a flowchart illustrating a handoff of a call on mobile unit 104 from circuit-based network 12 to packet-based network 14. Call handoff is treated like a call transfer operation. Handoff may occur from circuit-based network 12 to packet-based network 14, and vice versa. When mobile unit 104 enters packet-based network 14, it notices the availability of packet-based coverage. Mobile unit 104 launches registration procedures as described in FIG. 2. If mobile unit 104 has any calls in progress, it decides whether to hand off the calls to packet-based network 14. The decision to hand off a call in progress is a policy-based decision.

If the call is handed off, mobile unit 104 invokes a transfer operation at step 600 as it would for a normal call transfer. The call is transferred to a special number. This special number corresponds to a mobile unit 104 that is associated with the home MSC 108 of the provider offering the service. The current MSC 108 generates an IAM towards the special number at step 602. The IAM gets routed to STP 102 fronting the home MSC 108 for the special number at step 604. STP 102 recognizes the following: that the occurrence is a call setup for the special number, and that the originator of the call is mobile unit 104 currently registered on packet-based network 14. As a result, STP 102 diverts the call towards packet-based network 14 at step 606. The call is routed back to mobile unit 104 over packet-based network 14 at step 608 and the call is answered automatically at step 610. While a user of mobile unit 104 may notice a gap in media during the duration of the transfer, the cost of performing the transfer is considerably low. Alternative approaches occur at higher costs.

To provide for a seamless handoff, every call terminated for mobile unit 104, independent of whether mobile unit 104 is on packet-based network 14 or not, is routed through MG 100. If mobile unit 104 is not on packet-based network 14, the circuit is hairpinned in and out of MG 100. When mobile unit 104 roams into packet-based network 14, mobile unit 104 continues to receive media over circuit-based network 12. Once registered, mobile unit 104 sends a packet-based protocol message to a special number. The special number is routed to SS 114, which recognizes the special number. SS 114 instructs MG 100 to connect the existing circuit for the user to packet-based network 14, in addition to continuing to hairpin it into circuit-based network 12. Once the call is setup, mobile unit 104 receives two media streams with the same content, one over circuit-based network 12 and another over packet-based network 14. Mobile unit 104 then terminates its leg on circuit-based network 12. The termination message is stopped at STP 102 from tandem switch 110 so the call remains connected from tandem switch 110 to MG 100. However, hairpinning no longer occurs. Therefore, the call is seamlessly handed off.

Figure 7:
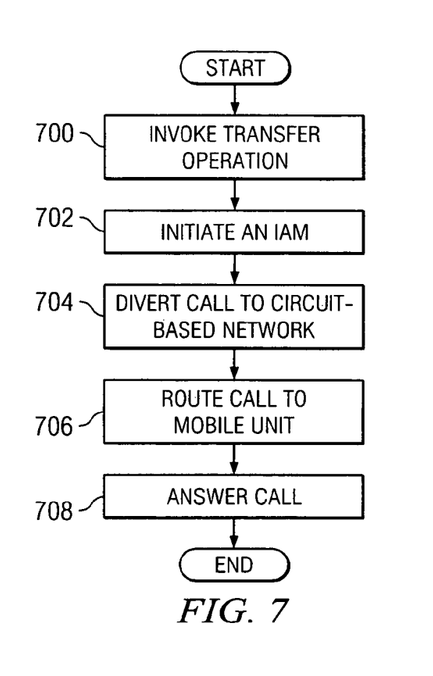
FIG. 7 is a flowchart illustrating a handoff of the mobile unit's call from the packet-based network to the circuit-based network.

FIG. 7 is a flowchart illustrating a handoff of a call on mobile unit 104 from packet-based network 14 to circuit-based network 12. When mobile unit 104 enters circuit-based network 12, it notices the availability of circuit-based coverage. Mobile unit 104 launches registration procedures as described in FIG. 3. If mobile unit 104 has any calls in progress, it decides whether to hand off the calls to circuit-based network 12. The decision to hand off a call in progress is a policy-based decision.

Once mobile unit 104 registers on circuit-based network 12, mobile unit 104 transfers the call on packet-based network 14 at step 700. Mobile unit 104 transfers the call to a special number that informs SS 114 that a handoff is occurring. SS 114 initiates an ISUP IAM message in circuit-based network 12 towards mobile unit 104 at step 702. Upon receiving the ISUP ANM, SS 114 instructs MG 100 to divert the call to circuit-based network at step 704. The call is routed to mobile unit 104 at step 706. Mobile unit 104 answers the call at step 708. Additionally, a technique for seamless handoff, similar to the above-described process, may be implemented when going from packet-based network 14 to circuit-based network 12.

Modifications, additions, or omissions may be made to any of the call-flow diagrams. For example, the messages within the call-flow diagram may occur using any suitable protocol. Additionally, messages, events, or a combination may occur in any suitable order.

While this disclosure has been described in terms of certain embodiments and generally associated methods, alterations and permutations of the embodiment and methods will be apparent to those skilled in the art. Accordingly, the above description of example embodiments does not constrain this disclosure. Other changes, substitutions, and alterations are also possible without departing from the scope and spirit of this disclosure.

What is claimed is:

1. A method for roaming between networks, comprising:
   subscribing to a presence server to determine a presence of a mobile unit, the presence server comprising a service that generates a notification of the presence of the mobile unit;
   receiving the notification of the presence of the mobile unit from the presence server;
   creating a state reflecting the presence of the mobile unit at a Signal Transfer Point (STP) that is co-located on a boundary of a first network and a second network;
   routing a call through the STP that is co-located on the boundary of the first network and the second network whether the call is established within the first network or the second network, wherein the STP uses the state to determine over which network to route the call;
   determining that the presence of the mobile unit changes from the first network to the second network;
   offloading signaling of the call through the STP to the second network; and
   retaining connection information associated with the first network at the SIP to facilitate reconnection with the first network.

2. The method of claim 1, wherein the first network is a circuit-based network and the second network is a packet-based network.

3. The method of claim 1, wherein the first network is a packet-based network and the second network is a circuit-based network.

4. The method of claim 1, further comprising:
   receiving a notification that the mobile unit is available on the second network;
   updating the state of the mobile unit based on the notification;
   routing incoming calls over the second network.

5. The method of claim 1, further comprising:
   receiving a target phone number to establish a new call;

determining in which network the target phone number is located;
routing the new call to the target phone number.

6. The method of claim 1, further comprising converting a signaling message in a first protocol to a second protocol, wherein the second protocol is associated with a network receiving the signaling message.

7. The method of claim 1, further comprising:
determining whether to hand off the call;
receiving a signaling message for a special number to which the call is being transferred;
determining a network on which the mobile unit is registered;
diverting the call to the network.

8. The method of claim 7, wherein receiving a signaling message includes determining a call setup is occurring for the special number.

9. A non-transitory computer readable medium encoded with software for roaming between networks, the software, when executed, operable to:
subscribe to a presence server to determine a presence of a mobile unit, the presence server comprising a service that generates a notification of the presence of the mobile unit;
receive the notification of the presence of the mobile unit from the presence server;
create a state reflecting the presence of the mobile unit at a Signal Transfer Point (STP) that is co-located on a boundary of a first network and a second network;
route a call through the STP that is co-located on the boundary of the first network and the second network whether the call is established within the first network or the second network, wherein the STP uses the state to determine over which network to route the call;
determine that the presence of the mobile unit changes from the first network to the second network;
offload signaling of the call through the STP to the second network; and
retain connection information associated with the first network at the STP to facilitate reconnection with the first network.

10. The non-transitory computer readable medium of claim 9, wherein the first network is a circuit-based network and the second network is a packet-based network.

11. The non-transitory computer readable medium of claim 9, wherein the first network is a packet-based network and the second network is a circuit-based network.

12. The non-transitory computer readable medium of claim 9, the software further operable to:
receive a notification that the mobile unit is available on the second network;
update the state of the mobile unit based on the notification;
route incoming calls over the second network.

13. The non-transitory computer readable medium of claim 9, the software further operable to:
receive a target phone number to establish a new call;
determine in which network the target phone number is located;
route the new call to the target phone number.

14. The non-transitory computer readable medium of claim 9, the software further operable to convert a signaling message in a first protocol to a second protocol, wherein the second protocol is associated with a network receiving the signaling message.

15. The non-transitory computer readable medium of claim 9, the software further operable to:
determine whether to hand off the call;
receive a signaling message for a special number to which the call is being transferred;
determine a network on which the mobile unit is registered;
divert the call to the network.

16. The non-transitory computer readable medium of claim 15, wherein receiving a signaling message includes determining a call setup is occurring for the special number.

17. A system for roaming between networks, comprising:
a mobile unit operable to roam between a first network and a second network;
a presence server operable to:
determine a presence of the mobile unit; and
generate a notification of the presence of the mobile unit; and
a Signal Transfer Point (STP) that is co-located on a boundary of a first network and a boundary of a second network, the STP operable to:
subscribe to the presence server to determine the presence of the mobile unit;
receive the notification of the presence of the mobile unit from the presence server;
create a state reflecting the presence of the mobile unit;
route a call through the STP whether the call is established within the first network or the second network, wherein the STP uses the state to determine over which network to route the call;
determine that the presence of the mobile unit changes from the first network to the second network;
offload signaling of the call through the STP to the second network; and
retain connection information associated with the first network at the STP to facilitate reconnection with the first network.

18. The system of claim 17, wherein the first network is a circuit-based network and the second network is a packet-based network.

19. The system of claim 17, wherein the first network is a packet-based network and the second network is a circuit-based network.

20. The system of claim 17, wherein the STP is further operable to:
receive a notification that the mobile unit is available on the second network;
update the state of the mobile unit based on the notification;
route incoming calls over the second network.

21. The system of claim 17, wherein the STP is further operable to:
receive a target phone number to establish a new call;
determine in which network the target phone number is located;
route the new call to the target phone number.

22. The system of claim 17, further comprising a soft switch operable to convert a signaling message in a first protocol to a second protocol, wherein the second protocol is associated with a network receiving the signaling message.

23. A system for roaming between networks, comprising:
means for subscribing to a presence server to determine a presence of a mobile unit, the presence server comprising a service that generates a notification of the presence of the mobile unit;
means for receiving the notification of the presence of the mobile unit from the presence server;
means for creating a state reflecting the presence of the mobile unit at a Signal Transfer Point (STP) that is co-located on a boundary of a first network and a second network;

means for routing a call through the STP that is co-located on the boundary of the first network and the second network whether the call is established within the first network or the second network, wherein the STP uses the state to determine over which network to route the call;

means for determining that the presence of the mobile unit changes from the first network to the second network;

means for offloading signaling of the call through the STP to the second network; and means for retaining connection information associated with the first network at the STP to facilitate reconnection with the first network.

24. The method of claim 1, wherein determining that the presence of the mobile unit changes from the first network to the second comprises:

receiving a second notification of a change in the presence of the mobile unit; and updating the created state to reflect the change in the presence of the mobile unit.

25. The computer readable medium of claim 9, wherein determining that the presence of the mobile unit changes from the first network to the second comprises:

receiving a second notification of a change in the presence of the mobile unit; and updating the created state to reflect the change in the presence of the mobile unit.

26. The system of claim 17, wherein the STP is further operable to:

receive a second notification of a change in the presence of the mobile unit; and update the created state to reflect the change in the presence of the mobile unit.

27. The method of claim 1, wherein:

determining that the presence of the mobile unit changes from the first network to the second network comprises determining that the presence of the mobile unit changes from the first network to an area of overlapping coverage on both the first network and the second network; and offloading signaling of the call through the STP to the second network_is performed in response to determining that the presence of the mobile unit has changed to the area of overlapping coverage on both the first network and the second network.

28. The method of claim 27, wherein offloading signaling of the call through the STP comprises offloading signaling of the call to the mobile unit via both the first network and the second network such that the mobile unit receives two streams of the call.

29. The method of claim 27, further comprising: automatically registering the mobile unit with the second network in response to determining that the presence of the mobile unit has changed from the first network to the area of overlapping coverage on both the first network and the second network.

30. The method of claim 27, further comprising deciding whether to route the call on the first network or the second network based on a user preference in response to determining that the presence of the mobile unit has changed from the first network to the area of overlapping coverage on both the first network and the second network.

31. The method of claim 1, wherein the call is established within the first network and offloaded through the STP to the second network.

* * * * *